United States Patent
Fischer et al.

(10) Patent No.: US 10,366,317 B2
(45) Date of Patent: Jul. 30, 2019

(54) METHOD AND SYSTEM FOR PREVENTING FORGERY

(71) Applicants: GIESECKE+DEVRIENT MOBILE SECURITY GMBH, München (DE); Dietrich Fischer, Graz (AT)

(72) Inventors: Dietrich Fischer, Graz (AT); Michael Baldischweiler, München (DE); Rastislav Motúz, Nitra (SK)

( * ) Notice: Subject to any disclaimer, the term of this patent is extended or adjusted under 35 U.S.C. 154(b) by 147 days.

(21) Appl. No.: 15/561,183

(22) PCT Filed: Mar. 18, 2016

(86) PCT No.: PCT/EP2016/056041
§ 371 (c)(1),
(2) Date: Sep. 25, 2017

(87) PCT Pub. No.: WO2016/150877
PCT Pub. Date: Sep. 29, 2016

(65) Prior Publication Data
US 2018/0053082 A1    Feb. 22, 2018

(30) Foreign Application Priority Data

Mar. 25, 2015   (DE) .................. 10 2015 003 837

(51) Int. Cl.
*G06K 19/07* (2006.01)
*G06K 19/10* (2006.01)
*G06K 19/077* (2006.01)

(52) U.S. Cl.
CPC ..... *G06K 19/0726* (2013.01); *G06K 19/0723* (2013.01); *G06K 19/07779* (2013.01); *G06K 19/07798* (2013.01); *G06K 19/10* (2013.01)

(58) Field of Classification Search
CPC ........... G06K 19/0726; G06K 19/0723; G06K 19/07779; G06K 19/07798; G06K 19/10
See application file for complete search history.

(56) References Cited

U.S. PATENT DOCUMENTS

| 6,891,474 B1 | 5/2005 | Fletcher |
| 7,652,575 B2 | 1/2010 | Lyons et al. |

(Continued)

FOREIGN PATENT DOCUMENTS

WO          03054808 A2    7/2003

OTHER PUBLICATIONS

German Search Report from DE Application No. 102015003837.0 dated Jul. 15, 2015.

(Continued)

*Primary Examiner* — Leon Flores
(74) *Attorney, Agent, or Firm* — Workman Nydegger

(57) ABSTRACT

A method for securing an object from forgery involves a seal element having an antenna structure, an object to be secured, and at least one coupling element arranged or arrangeable at the object is supplied. The coupling element influences a value of an oscillating circuit parameter of the antenna structure when the antenna structure is arranged relative to the coupling element at the object. The seal element and the coupling element are arranged at the object such that a relative arrangement of the antenna structure to the coupling element at the object is fixed by which the value of the oscillating circuit parameter of the antenna structure arranged at the object is defined in dependence on the fixed relative arrangement, and serve as an authentication feature of the object. The value of the oscillating circuit parameter can be measured and associated with the object an authentication feature.

16 Claims, 5 Drawing Sheets

(56) References Cited

U.S. PATENT DOCUMENTS

| | | |
|---|---|---|
| 7,839,288 B2 | 11/2010 | Wang et al. |
| 7,849,993 B2 | 12/2010 | Finkenzeller et al. |
| 2002/0067264 A1 | 6/2002 | Soehnlen |
| 2003/0075608 A1 | 4/2003 | Atherton |
| 2005/0150740 A1 | 7/2005 | Finkenzeller et al. |
| 2007/0029384 A1 | 2/2007 | Atherton |
| 2009/0102646 A1 | 4/2009 | Bara et al. |
| 2014/0070923 A1 | 3/2014 | Forster et al. |

OTHER PUBLICATIONS

International Search Report from PCT Application No. PCT/EP2016/056041, dated Jun. 13, 2016.

METHOD AND SYSTEM FOR PREVENTING FORGERY

BACKGROUND

This invention relates to a method and a system for securing an object from forgery. In particular, the invention relates to a method and a system for securing an object from forgery by means of a seal element which comprises an antenna structure, for example a coil, which can be regarded as an electrical oscillating circuit.

Conventional methods for securing objects by means of a seal are based substantially on the fact that the seal is configured such that a tampering with the object can be recognized by the fact that the seal has been destroyed or at least damaged. A tampering with a seal which comprises a coil can be recognized, for example, by the fact that the coil has been damaged, for example has a conducting path break. Such a conducting path break is easily recognizable by means of suitable evaluation methods.

A securing from forgery by means of a seal element or seal is then ineffective if one succeeds in detaching the seal from the object without damage and in again applying it, either on the original object or on a forged object.

SUMMARY

Consequently, it is the object of the present invention to propose a method and a system for securing an object from forgery by means of a seal element which also make a non-destructive detaching and again applying of the seal to an object recognizable.

The present invention is based on the basic idea of employing an oscillating circuit property, for example a self-resonant frequency or a quality factor of the oscillating circuit, which is supplied by an antenna structure of the seal element, as an authentication feature of an object which is secured with the seal. Here, the seal is arranged on the object relative to at least one coupling element. The coupling element is provided and devised to change the oscillating circuit property of the antenna structure. The value of the oscillating circuit property is defined only by the relative arrangement of the antenna structure to the at least one coupling element at the object. Consequently, each relative arrangement of the antenna structure to the at least one coupling element delivers a specific value of the oscillating circuit parameter, which can therefore be employed as an authentication feature.

A preferred embodiment of a method for securing an object from forgery therefore comprises the following steps:

A seal element is supplied having an antenna structure which can be regarded as an electrical oscillating circuit.

Further, an object to be secured is supplied.

Finally, at least one coupling element arranged at the object or arrangeable at the object is supplied. Such a coupling element is provided and devised to influence a value of an oscillating circuit parameter, for example a quality factor or a self-resonant frequency, of the oscillating circuit, which is supplied by the antenna structure of the seal element, when the antenna structure is arranged relative to the at least one coupling element at the object.

Suitable coupling elements are, for example, such elements which can act as an additional capacity and/or additional inductance. Additional capacities can be formed, for example by metallic faces, additional inductances can be supplied, for example by coil elements.

A coupling element according to the present application is an element separate of the antenna structure of the seal element. In the case that the seal element, in addition to the antenna structure, has further structural parts connected to or to be connected to the antenna structure, for example a chip, additional antenna portions the like which serve a functionality of the antenna structure other than the one described here (e.g., of the contactless data transfer etc.), thus these structural parts may not be mistaken for the coupling element according to the invention—even if these structural parts change the oscillating circuit properties of the antenna structure. Further, as intended by the invention, elements or constituents of the object to be secured per se should not be mistaken with the coupling element according to the invention, which is always supplied separately of the object and separately of the antenna structure of the seal element and structural parts possibly connected thereto. The antenna structure of the seal element is per se fully functional without the supplying of the coupling element and forms an electrical oscillating circuit already without the coupling element. The parameters of this oscillating circuit are influenced according to the invention by the supplying of the coupling elements in a targeted manner to thereby obtain an individual feature of the object, i.e. an authentication feature.

To unambiguously characterize the object to be secured, in a further step the seal element and, if not already happened, the at least one coupling element is now arranged at the object such that a relative arrangement of the antenna structure to the at least one coupling element at the object is fixed. The value of the oscillating circuit parameter of the antenna structure arranged at the object is thereby defined unambiguously in dependence on the fixed relative arrangement of the antenna structure to the at least one coupling element. Hence this value of the oscillating circuit parameter can act as an authentication feature of the object secured by means of the seal element. A detaching and re-attaching of the seal element to the object can then be recognized from the fact that already a slightly deviating arrangement of the seal element relative to the coupling elements arranged unchanged results in a changed value of the oscillating circuit parameter in comparison to the original arrangement.

A described seal element can be manufactured very simply and cost-efficiently, because as an antenna structure, for example, merely a simple antenna coil has to be applied. The described coupling elements can also be supplied simply and cost-efficiently and applied to the object to be secured or attached to the object to be secured.

Meanwhile also known are methods described hereinafter still in detail which make it possible to precisely measure the value of an oscillating circuit parameter in a simple and cost-efficient manner. Consequently, the method according to the invention can serve effectively and cost-efficiently for securing from forgery and also reveal such attempts at tampering which consist of a non-destructive detaching and a re-applying of the seal element to the object.

Preferably, the method comprises the following further steps: the value of the oscillating circuit parameter of the antenna structure arranged at the object relative to the at least one coupling element is measured by means of a measuring apparatus. The measured value is then associated with the object having the seal element arranged thereto as an authentication feature of the object.

According to a preferred variant, the step of associating the measured value with the object having the seal element arranged thereto can comprise the following substeps:

A seal identifier of the seal element and/or an object identifier of the object secured by means of the seal is read out. The reading out is effected preferably automatically by means of a suitable read-out device. The measured value of the oscillating circuit parameter is then stored together with the read-out identifier in a storage device of a suitable measuring apparatus.

According to a preferred variant, the measured value of the oscillating circuit parameter is not displayed by the measuring apparatus to prevent attempts at tampering. Further, it is preferred to store the measured value together with the read-out identifier in the measuring apparatus in encrypted form. In this manner it can be prevented that a tampering with the transferred data can be performed upon transferring the measured value and the identifier stored therefore to a later receiver of the object.

As already indicated, in a further step the measured value of the oscillating circuit parameter can be transferred together with the read-out value of the seal identifier and/or the object identifier to a later receiver of the object. The receiver of the object can store the received value together with the received identifier as a reference value. For example, a constellation in which a bank-note cassette is secured as an object by means of the seal element is imaginable here, for example in a supermarket. The later receiver of the object can then be, for example, a cash center or a bank to which the secure bank-note cassette is conveyed for further processing.

These steps are preparatory steps which put the later receiver of the object in a position to check, in the manner described hereinafter, the received object to the effect whether or not a tampering with the seal has been performed.

After the receiving of the object by the receiver, said receiver can read out a seal identifier of the seal element and/or an object identifier of the received object. Further, the receiver can measure the value of the oscillating circuit parameter of the antenna structure arranged at the received object relative to the at least one coupling element by means of a suitable measuring apparatus. Finally, the receiver will compare the currently measured value with a reference value stored to the read-out identifier. A suitable comparative apparatus can be employed for this purpose.

This comparative step enables the receiver a check as to whether the seal has been tampered with. I.e., it can also be recognized whether the seal has been removed from the object and again applied to the object. As soon as the measured value deviates only slightly from the stored reference value, this points to the fact that the arrangement of the seal on the object received by the receiver does not match the original arrangement of the seal on the object anymore. It will be appreciated that in this comparative step a destruction of the seal, in particular a conducting path break of the antenna structure of the seal, can also be recognized reliably. Such a destruction of the seal is recognizable with the help of the value of the measured oscillating circuit parameter in a simple manner.

The step of measuring the value of the oscillating circuit parameter, both upon the first measuring after arranging the seal element relative to the at least one coupling element for forming the authentication feature, as well as subsequently upon measuring at the receiver of the object for verifying the intactness of the seal, can be carried out advantageously in the following manner.

The antenna structure of the seal element, which is regarded as an electrical oscillating circuit, can be excited by an exciter antenna of a measuring apparatus by means of an energy pulse. Subsequently, a decaying oscillation of the antenna structure, i.e. of the oscillating circuit, in response to the excitation is captured by the energy pulse by means of a measuring antenna of the measuring apparatus. The captured oscillation of the antenna structure is finally evaluated with regard to the value of the oscillating circuit parameter by means of a suitable evaluation device of the measuring apparatus.

Here, the exciting of the antenna structure is preferably effected as an inductive exciting by means of a pulsed magnetic field. Here, the magnetic field is preferably generated by an individual current pulse. The current pulse can preferably be generated as a direct-current pulse in the form of a Dirac impulse.

This measuring method is suited in special way for the method according to the invention for securing from forgery because it can be carried out by means of a very simple measuring apparatus and can measure the value of the relevant oscillating circuit parameter with sufficient precision.

A preferred embodiment of a system according to the invention for securing an object from forgery therefore comprises a seal element with an antenna structure, in particular a coil, and at least one coupling element arrangeable at the object or arranged at the object.

The at least one coupling element is provided and devised to influence a value of an oscillating circuit parameter of the antenna structure when the antenna structure is arranged relative to the coupling element at the object. The seal element and the at least one coupling element are provided and devised to be arranged at the object to be secured such that a relative arrangement of the antenna structure to the at least one coupling element at the object is fixed unambiguously. The value of the oscillating circuit parameter of the antenna structure arranged at the object is thereby defined unambiguously in dependence on the mentioned relative arrangement.

Here, the antenna structure of the seal element and the at least one coupling element can be arranged on a common carrier. This carrier can be the seal element itself for example. The seal element can be configured, for example, in such a way that it can be arranged in the form of a sticker, for example to a cover of an object to be secured. The arrangement can be effected such that, for example, the portion of the seal element which carries the at least one coupling element is arranged at the underside of the cover, and the portion of the seal element which carries the antenna structure is arranged at the upper side of the cover. The relative position of the antenna structure to the coupling element is hence variable, as long as the seal element is not yet arranged in a final manner at the object, and can be fixed in unambiguous manner upon arranging the seal element at the object to be secured.

According to an alternative, preferred variant, the antenna structure of the seal element and the at least one coupling element are present in different, separate carriers. Here, the seal element can comprise, for example, merely the antenna structure. One or several coupling elements can be present on a separate carrier. Further, it is possible that each coupling element or individuals of a multiplicity of coupling elements are present on a separate carrier or do not need a separate carrier, but rather are arrangeable directly at the object. This embodiment allows in particular to attain many different arrangements of the antenna structure of the seal element relative to the at least one coupling element at the object.

As mentioned hereinabove, according to one embodiment a coupling element can be supplied as such an element which acts as an additional capacity on the oscillating circuit which is supplied by the antenna structure of the seal element. The coupling element can, for example, be present as a metallic area, e.g., as a aluminium-foil or ferrite foil. As mentioned, such metallic areas can be present, for example, as foil elements, even without separate carrier. Alternatively, a carrier can be supplied which comprises a multiplicity of such coupling elements.

According to another embodiment, the coupling element can be provided as an element which acts as an additional inductance for the oscillating circuit supplied by the antenna structure of the seal element. In particular, the coupling element can be configured as a coil. As a rule, such a coil is present on a separate carrier, for example in the printed form, which can then be arranged at the object.

Finally, it is possible, for example, that the coupling element comprises a material having a predetermined permittivity higher than the surrounding region. An oscillating circuit parameter of the antenna coil of the seal element can also be influenced in this manner.

All embodiments of the described coupling elements, which can also be combined, have the effect that, when they are arranged in relative proximity to the antenna structure of the seal element at the object, they influence the oscillating circuit properties of the oscillating circuit supplied by the antenna structure. Hence, every change of the relative position of the antenna structure to the at least one coupling element changes the value of an oscillating circuit parameter of the antenna structure.

According to a further preferred embodiment, a multiplicity of the coupling elements is employed which are arranged on the object to be secured in irregular, preferably random manner. To obtain the desired effect according to the invention that a changed relative arrangement of the antenna structure to the at least one coupling element results in a changed value of an oscillating circuit parameter, it is required that the coupling element is configured such that, when the antenna structure is arranged relative thereto, it supplies irregularities or inhomogeneities in the region of the antenna structure.

For this purpose, for example, a carrier can be supplied which comprises a multiplicity of coupling elements arranged in irregular or random manner. Here, the irregularity of the coupling elements can affect different parameters, such as the size, the form or the material of the coupling elements and also the relative position of the coupling elements to each other on the carrier.

Preferably, the at least one coupling element is arranged at an object to be secured such that it is unrecognizable upon exterior viewing of the object. In this manner, anyone undertaking a tampering with the object by detaching the seal and later re-applying the seal is impeded in counteracting the described method. Evidently, it is all the more difficult to again arrange a detached seal in the original arrangement relative to the coupling elements if the coupling elements are unrecognizable.

According to a further variant, the system according to the invention hence comprises the object to be secured and the at least one coupling element is arranged at the object such that the coupling element is unrecognizable upon exterior viewing of the object.

As mentioned hereinabove, the antenna structure of the seal element is preferably configured in the form of a coil. Here, such a coil comprises at least one coil turn. The coil can be imprinted, for example, on the seal element or be embedded into a multilayer seal element. An open coil is in particular suitable because said coil is particularly sensitive to capacity changes. However, a closed coil can also be employed. Between the coil ends, a meandering area can then be inserted which supplies an additional possibility of a stronger capacity coupling with the at least one coupling element.

Preferably, the seal element comprises an unambiguous seal identifier. The object equipped with the seal can be characterized unambiguously by means of the seal identifier. Alternatively or additionally, the object can also comprise an unambiguous object identifier. Here, the identifiers are configured as a rule such that they can be read out automatically by means of a suitable read-out device. Bar codes or similar codings are suited for this purpose.

The system according to the invention can further comprise a measuring apparatus with a storage device. The measuring apparatus is devised, when the seal element and the at least one coupling element are arranged relative to each other at the object to be secured, to read out a seal identifier of the seal element and/or an object identifier of the object by means of a read-out device. For example, a bar code reader or the like can be employed as a read-out device.

Further, the measuring apparatus is devised to measure the value of the oscillating circuit parameter of the antenna structure arranged at the object. A preferred embodiment of such a measuring apparatus will be described more precisely hereinafter.

Finally, the measuring apparatus is devised to store the measured value together with the read-out identifier in the storage device. The measuring apparatus can further be devised to transfer the measured and read-out values to a future receiver of the object. Preferably, the storage of the measured value and the read-out identifier(s) as well as the transfer of the same is effected in encrypted form, as mentioned hereinabove.

Such a measuring apparatus, employed on the part of the receiver of the object, is preferably devised to read out a seal identifier of the seal element and/or an object identifier of the object by means of the readout direction, and to measure the value of the oscillating circuit parameter of the antenna structure arranged at the received object. Further, the measuring apparatus is devised to compare the measured value with a reference value stored in the storage device together with the read-out identifier. This comparison, as already described hereinabove, serves to check whether the seal of the object has been tampered with.

A preferred embodiment of the measuring apparatus comprises an exciter antenna for exciting the antenna structure regarded as an oscillating circuit of the seal element by means of an energy pulse. Further, the measuring apparatus comprises a measuring antenna for capturing a decaying oscillation of the antenna structure in response to the excitation by the energy pulse. Finally, the measuring apparatus comprises an evaluation device for evaluating the captured oscillation of the antenna structure with regard to value of the oscillating circuit parameter. It is also conceivable, however, to utilize an antenna as an exciter antenna and measuring antenna and/or to provide a common exciter unit and measurement unit.

BRIEF DESCRIPTION OF THE DRAWINGS

The present invention will be described hereinafter by way of example with reference to the attached drawings. Therein are shown.

DETAILED DESCRIPTION OF VARIOUS EMBODIMENTS

Figure 1A:
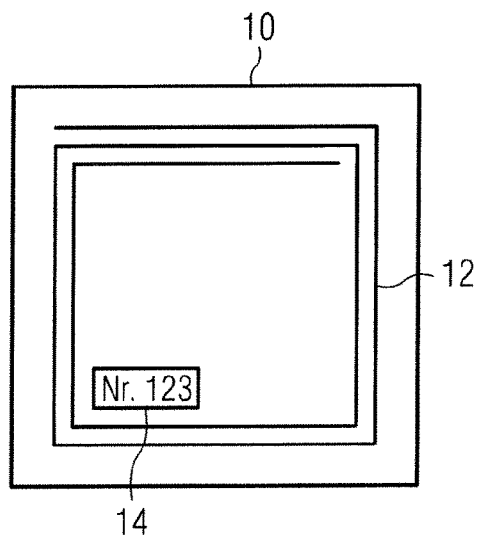
FIGS. 1A and 1B preferred embodiments of a seal element according to the invention.
Figure 3A:
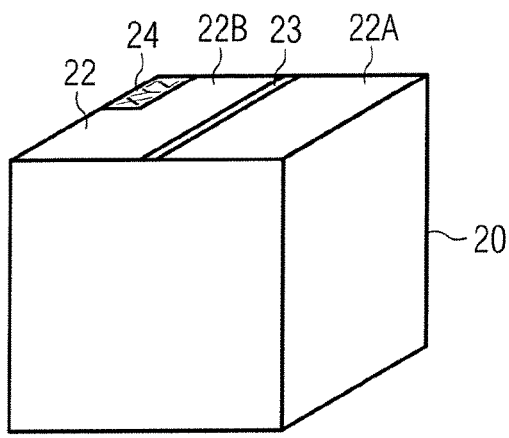
FIG. 3A an object to be secured in the form of a container with a hinged cover.
Figure 3B:
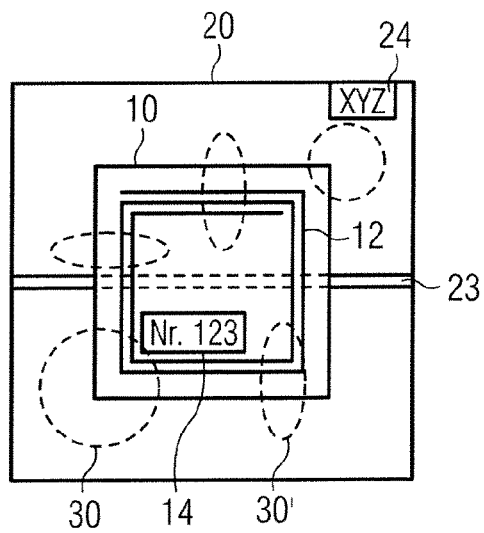
FIGS. 3B and 3C the cover of the container from FIG. 3A in plan view having coupling elements arranged thereto and a seal element arranged respectively in individual position from FIG. 1A.
Figure 3C:
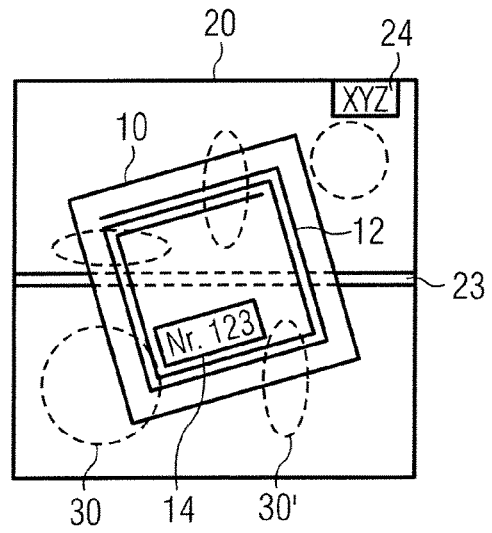

In FIG. 1A, a first embodiment of a seal element 10 is shown which is suitable to be applied, for example bonded, to an object to be secured 20 (cf. FIG. 3B, 3C). The seal element 10 can be bonded in particular such that it is destroyed upon a tampering with the object 20, for example if it is bonded across a cover 22 of an object 20 such that the seal 10 is necessarily destroyed upon opening the cover 22.

The seal element 10 comprises a carrier element, for example of paper or plastic, as well as an antenna structure arranged on the carrier element 12, in the shown example in the form of an open coil. Further, the seal element 10 comprises a seal identifier 14 which characterizes the seal element 10 in unambiguous manner.

Figure 1B:
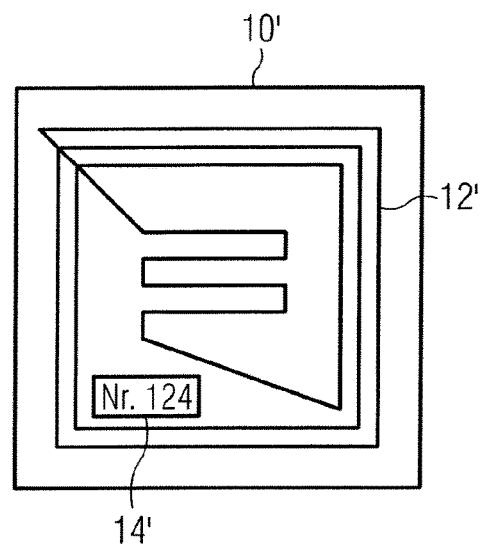

The seal element 10' represented in FIG. 1B differs from the seal element 10 from FIG. 1A to the effect that the antenna structure 12' is present as a closed coil 12, wherein the portion which connects the two coil ends (cf. FIG. 1A) comprises a meandering structure. Both coils 12, 12' are particularly sensitive to capacity influences which are supplied by coupling elements 30 arranged relative to the coils 12, 12'.

Figure 2A:
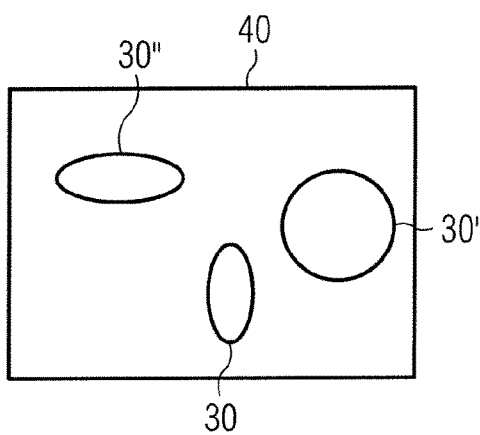
FIGS. 2A and 2B carrier elements which comprise preferred embodiments of coupling elements according to the invention.

In FIG. 2A, a carrier 40 is represented which comprises a multiplicity of coupling elements 30, 30', 30'' acting as a capacity. The coupling elements 30, 30', 30'' are present as metallic faces which have respectively a different size and form, and are arranged on the carrier 40 in random manner. The number, form, material and relative arrangement of the coupling elements can vary.

Figure 2B:
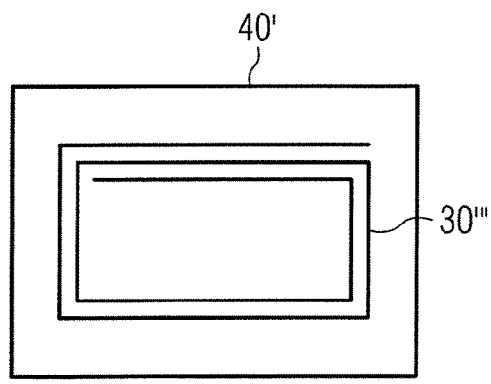

In FIG. 2B, a carrier 40' is represented which carries a coupling element 30', which is present in the form of a coil. In connection with the hereinafter described method, such a coupling element can act as an additional inductance which can likewise have influence on an oscillating circuit parameter of the antenna structure 12 of the seal element 10.

In FIG. 3A, an object to be secured 20 in the form of a container is represented by way of example. The container 20 can represent, for example, a bank-note cassette or the like, which comprises a cover 22 which can be opened. Cover 22 is configured in two-part fashion and comprises the portions 22A and 22B. Between the cover portions, a gap 23 is indicated. To secure the container 20 from tampering, a seal element 10, as it is displayed in FIG. 1, can now be bonded onto the cover 22 such that the gap 23 is covered. Upon an opening of the cover 22, as a rule a seal 10 bonded to it would thus be destroyed.

In the FIGS. 3B and 3C, the container 20 from FIG. 3A is shown in plan view. For securing the object 20, on the one hand a multiplicity of coupling elements 30, 30' have here been arranged on the underside of the cover shares 22A and 22B. The dashed representation of the coupling elements 30, 30' is to indicate that these are not recognizable to a viewer from the outside, i.e. upon closed cover 22. Further, respectively a seal elements 10 arranged on the surface of the cover 22 is represented in the FIGS. 3B and 3C. The FIGS. 3B and 3C differ merely to the effect that in FIG. 3C the seal element is arranged differently relative to the coupling elements than in FIG. 3B.

On account of the fact that the coupling elements 30 influence an oscillating circuit parameter of the oscillation circuit formed by the antenna structure 12 of the seal element 10, a measuring of the value of the oscillating circuit parameter of the antenna structure 12, as it is arranged in FIG. 3B on the container 20 relative to the coupling elements 30, 30', will yield a value other than a measuring in an arrangement according to FIG. 3C. If thus, for example, for securing the container 20 the seal 10 has originally been applied in an arrangement according to FIG. 3B and, after a tampering, has again been arranged on the container according to FIG. 3C, such a tampering can doubtlessly be recognized with the method described hereinafter, even if the seal is per se undamaged.

Figure 4:
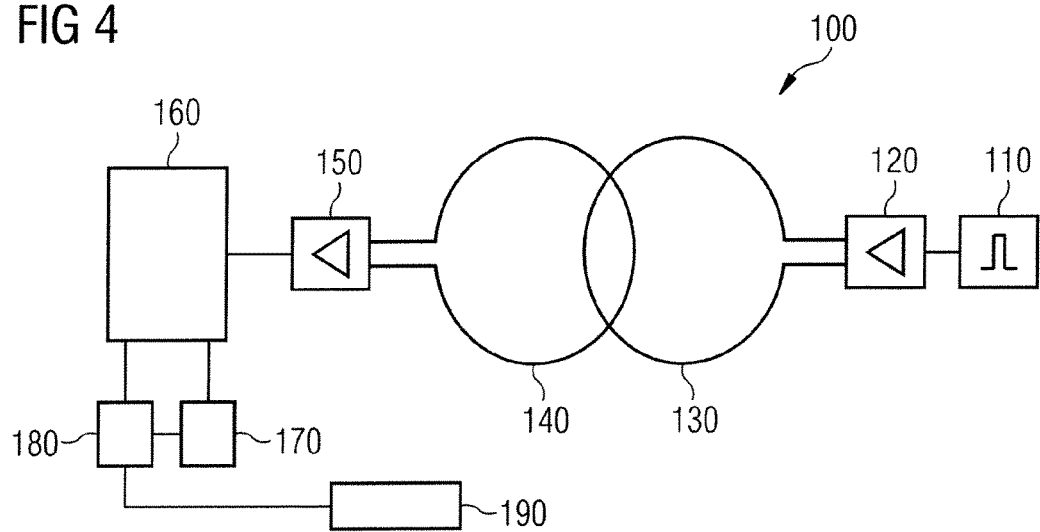
FIG. 4 a preferred embodiment of a measuring device according to the invention.

In FIG. 4 a preferred embodiment is represented by way of example of a measuring apparatus supporting the method 100 described hereinafter. The measuring apparatus 100 can serve for measuring an oscillating circuit parameter of an antenna structure 12 of a seal element 10 from FIG. 1A, 1B.

Here, the measuring apparatus 100 comprises a pulse generator 110 which is preferably connected to an exciting coil 130 via an amplifier 120. By means of an energy pulse generated by the pulse generator 110, preferably in the form of a Dirac impulse, the antenna structure 12 can be excited contactlessly via the exciting coil 130 when the exciting coil 130 is suitably arranged relative to the antenna structure 12 of the seal element 10.

The measuring antenna 140 is devised to capture an oscillation of the antenna structure to be checked 12 and relay it preferably via an amplifier 150 to an evaluation device 160. For the measurement, the exciting coil 130 and the measuring antenna 140 are to be arranged at a suitable, preferably close distance beside the antenna structure 12 of the seal element to be checked 10. The measuring antenna 140 captures the oscillation of the antenna structure 12 decaying in response to the excitation by the energy pulse.

The measuring apparatus 100 further comprises a storage apparatus 180 and a comparing device 170 as well as a read-out device 190.

The read-out device 190 is devised to read out an identifier 14 of a seal to be checked 10 or an identifier 24 of an object 20 (cf. FIG. 3A) secured by means of the seal 10. The read-out device 190 is connected to the storage device 180 so that read-out values can be stored directly in the storage device 180.

The storage device 180 is further devised to store a measurement value of a measured oscillating circuit parameter of a checked seal element 10 which the evaluation device 160 has established. A storing of a measurement value is effected preferably together with the storing of an identifier 14 of the corresponding seal element 10 or the identifier 24 of the object 20 which the seal element 10 is applied to, whose antenna structure 12 has the measured parameter value.

The comparing device 170 is devised to compare a measured value of an oscillating circuit parameter of a seal element 10, which a read-out identifier 14, 24 is associated with, with a stored reference measurement value which is stored to the read-out identifier in the storage device.

Figure 6:
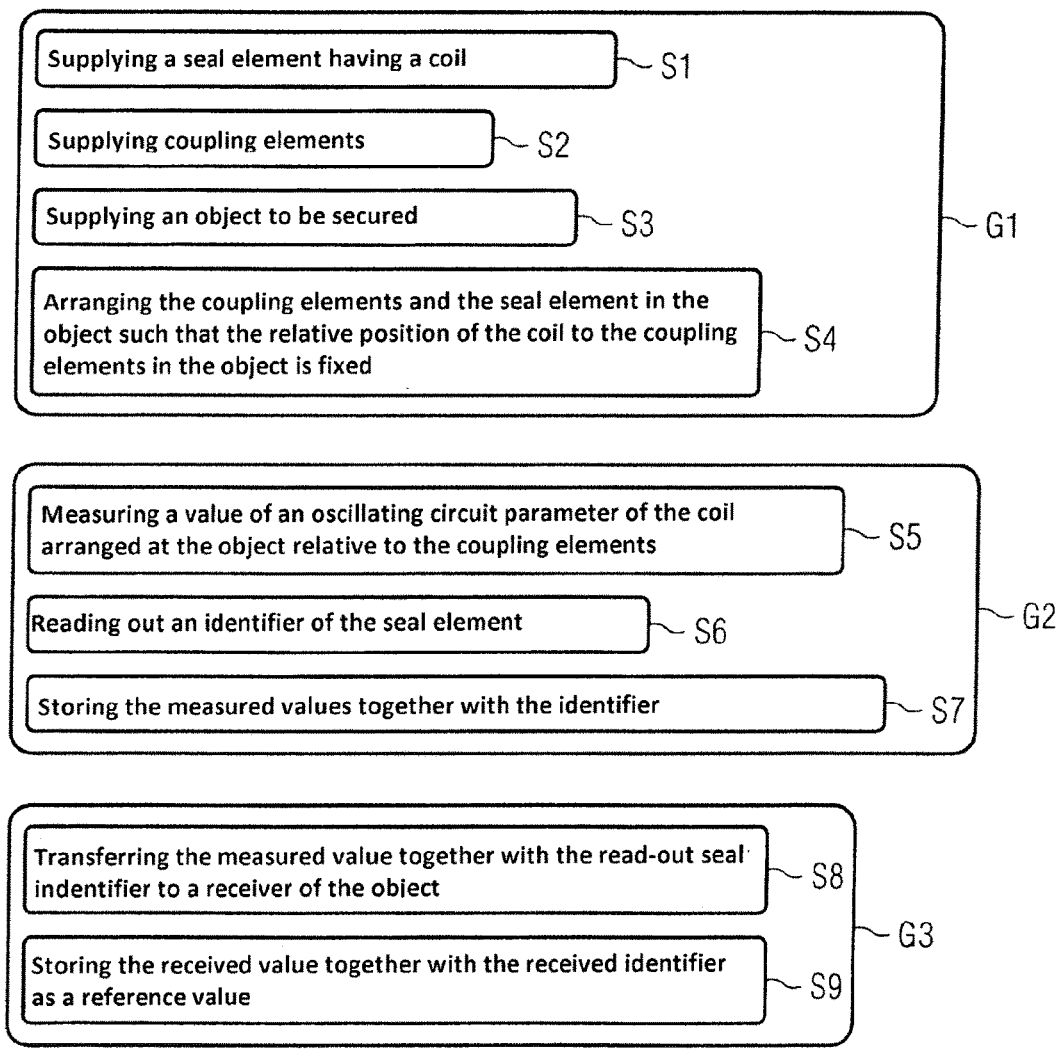
FIGS. 6 and 7 steps of a preferred embodiment of a method according to the invention for securing an object from forgery.

The employment of the individual components of the measuring apparatus 100 is illustrated once more hereinafter with reference to the method according to FIGS. 6 and 7.

Figure 5:
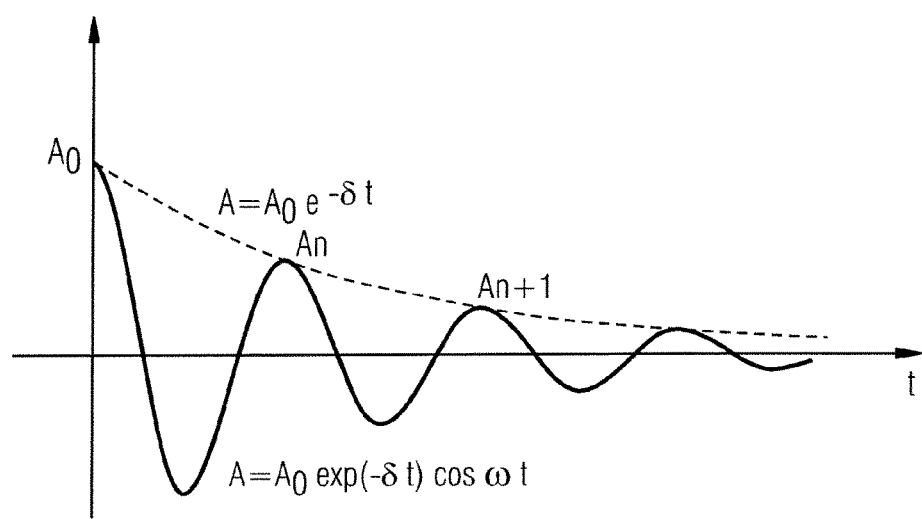
FIG. 5 schematically the course of a free, damped oscillation.

FIG. 5 shows the theoretical course of a free, damped oscillation A(t) in the course of time t. Here, the function A(t) can correspond to the current I or the voltage U. The angular frequency ω corresponds to a resonance frequency of the antenna structure 12 multiplied by 2□. From the decay coefficient δ one can determine the quality factor of the antenna circuit 12. A correspondingly decaying oscillation arises in response to the excitation by means of an energy pulse described in the present case.

With reference to the FIGS. 6 and 7, steps of a preferred embodiment of a method are described hereinafter for securing an object 20 from forgery by means of a seal element 10.

Here, the steps of the first group G1 serve to secure the object 20 in unambiguous manner and equip it with an authentication feature.

With the steps of the group G2, the authentication feature is measured, namely the unambiguously defined value of an oscillating circuit parameter of the antenna structure 12 of the seal element 10, which results from a specifically defined relative arrangement of the antenna structure 12 relative to the coupling elements 30, and said authentication feature is associated with the objects 20 secured by means of the seal element 10.

The steps of the group G3 serve for handing over the established values to a future receiver of the secure object 20 so that said receiver can subsequently check a received object 20 on the basis of the received information items.

Figure 7:
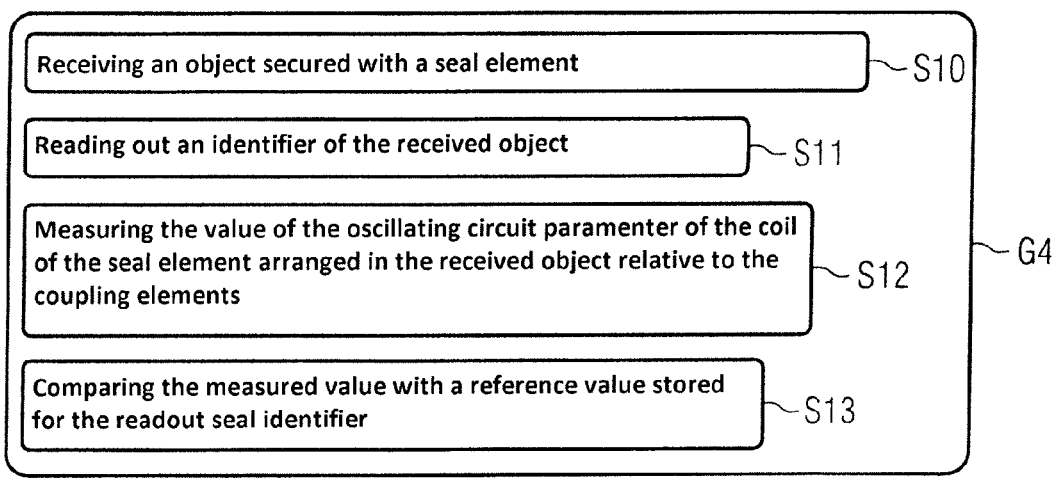

Steps of such a check are finally represented with reference to the group G4 in FIG. 7.

In detail, the different groups comprise the following steps:

In a first step S1, a seal element 10 with an antenna structure, e.g. of a coil 12, is supplied. Further, at least one coupling element 30 is supplied, for example, on one or several carriers 40, as they are represented in FIGS. 2A and 2B. In a step S3, an object to be secured 20 is supplied, such as a container 20 from FIG. 3A.

In step S4, the coupling elements 30 and the seal element 10 are now arranged at the object 20 such that the relative arrangement of the coil 12 to the at least one coupling element 30 at the object 20 is fixed unambiguously. Such an arrangement is represented, e.g. in FIG. 3B by way of example.

After a carrying out of the steps S1 to S4, the object 20 is characterized in unambiguous manner by the seal element 10 and the coupling elements 30 unambiguously arranged relative thereto. An oscillating circuit parameter of the antenna structure 12, e.g. its quality factor, can hence be employed as an authentication feature of the secured object 20.

In step S5, which represents the first step of the group G2, a value of an oscillating circuit parameter is now measured at the coil 12 arranged at the object 20 relative to the coupling elements 30. Here, in particular a quality factor Q or a self-resonant frequency of the coil 12 can serve as an oscillating circuit parameter. For measuring the value, preferably the measuring apparatus 100 from FIG. 4 is employed. Here, the antenna structure 12 is excited by the exciter antenna 130 by means of an energy pulse. A decaying oscillation of the antenna structure 12 in response to the excitation by the energy pulse is then captured by means of the measuring antenna 140. The evaluation device 160 evaluates the captured oscillation and therefrom determines the value of the oscillating circuit parameter of the antenna structure 12.

In step S6, the identifier 14 of the seal element 10 is read out, and in step S7 the value measured in step S5 of the oscillating circuit parameter together with the read-out identifier 14 is stored in the storage apparatus 180 as an authentication feature of the secure object 20. Alternatively or additionally, an identifier 24 of the object can be also read out in step S6 and in step S7 be stored together with the measured value. Preferably, the measured value is not displayed by the measuring apparatus 100 to prevent tampering. The measuring apparatus 100 can display, for example, merely that a measurement has been successfully effected. As a rule, the measured value is stored together with the read-out identifier 14, 24 in encrypted form. This also serves to prevent tampering with the measured and read-out values.

In step S8, the value measured in step S5 is transferred together with the identifier 14 read out in step S6 to a future receiver of the object 20, preferably also in encrypted form. The receiver stores the received data, preferably in a storage device 180, of a measuring apparatus 100 according to FIG. 4. It will be appreciated that the receiver is able to decrypt the data received in encrypted form. The received measured value serves the receiver as a reference value upon checking an object received in the future, as will be explained hereinafter with reference to the steps S10 to S13 of the group G4.

After the receiver has received an objects 20 secured by means of the seal element 10 in step S10, it reads out in step S11 an identifier 14 of the seal elements 10 arranged on the object 20 or an identifier 24 of the object 20. Further, on the part of the receiver, the value of the oscillating circuit parameter of the coil 12 of the seal element arranged on the received object 20 relative to the coupling element 30 is measured in step S12. Preferably, for this purpose the receiver also employs, as mentioned, a measuring apparatus according to the FIG. 4 in whose storage device 180 are stored the data stored in step S9, i.e. the reference value together with the corresponding identifier 14, 24 of the seal 10 or of the object 20 secured by means of seal 10.

Finally, in step S13, the receiver compares the value of the oscillating circuit parameter measured at the received object 20 with the reference value stored for the read-out identifier 14, 24. In the case that both values, that is the reference value and the measured value substantially match except for measuring tolerance, it can be assumed that the object 20 has not been tampered with and that the seal is still present on the object 20 in unchanged manner, as it has originally been arranged in step S4 on the object 20. However, in the case that the measured value deviates significantly from the reference value, it is to be concluded that the seal element 10 has meanwhile, that is before it has reached the receiver, been removed from the object 20 without authorization and later been again arranged. In this case, it is to be assumed that the object 20 has been tampered with.

It will be appreciated that a damage of the seal 10, in particular a damage of the coil 12, can also be recognized unambiguously, for example by a conducting path break, with the help of the measured value in comparison to the reference value if this is not already derivable by optical check.

The invention claimed is:

1. A method for securing an object from forgery, comprising the steps:

supplying a seal element having an antenna structure;

supplying an object to be secured;

supplying at least one coupling elements arranged at the object or arrangeable at the object;

arranging the seal element and, where applicable, the at least one coupling element at the object such that a relative arrangement of the antenna structure to the at least one coupling element at the object is fixed;

measuring the value of the oscillating circuit parameter of the antenna structure arranged at the object relative to the at least one coupling element by means of a measuring apparatus; and associating the measured value with the object having the seal element arranged thereto as an authentication feature of the object;

wherein the coupling element is provided and suitable to influence a value of an oscillating circuit parameter of the antenna structure when the antenna structure is arranged relative to the at least one coupling element at the object, and by the arranging, the value of the oscillating circuit parameter of the antenna structure arranged at the object is defined in dependence on the fixed relative arrangement.

2. The method according to claim 1, wherein the step of associating the measured value with the object having the seal element arranged thereto comprises the following substeps:

reading out a seal identifier of the seal element and/or an object identifier of the object by means of a read-out device; and storing the measured value of the oscillating circuit parameter together with the read-out seal identifier and/or the read-out object identifier in a storage device.

3. The method according to claim 2, wherein the further steps:

transferring the measured value together with the read-out seal identifier and/or the read-out object identifier to a receiver of the object and storing of the received value together with the received seal identifier and/or received object identifier as a reference value at the receiver.

4. The method according to claim 3, wherein the further steps at the receiver of the object after the receiving of the object:

reading out a seal identifier of the seal element and/or an object identifier of the received object by means of a read-out device;

measuring the value of the oscillating circuit parameter of the antenna structure arranged at the received object relative to the at least one coupling element by means of a measuring apparatus and comparing the measured value with a reference value stored to the read-out seal identifier and/or the read-out object identifier by means of a comparative apparatus.

5. The method according to claim 4, wherein the step of measuring the value comprises the following substeps:

exciting the antenna structure by a measuring apparatus by means of an energy pulse;

capturing a decaying oscillation of the antenna structure in response to the excitation by the energy pulse with the measuring apparatus; and evaluating the captured oscillation of the antenna structure with regard to the value of the oscillating circuit parameter by means of the measuring apparatus.

6. The method according to claim 5, wherein the exciting of the antenna structure is effected as an inductive exciting by means of a pulsed magnetic field, wherein the magnetic field is generated preferably by an individual current pulse and/or the current pulse is generated preferably as a direct current pulse in the form of a Dirac impulse.

7. The method according to claim 1, wherein the step of measuring the value comprises the following substeps:

exciting the antenna structure by a measuring apparatus by means of an energy pulse; capturing a decaying oscillation of the antenna structure in response to the excitation by the energy pulse with the measuring apparatus and evaluating the captured oscillation of the antenna structure with regard to the value of the oscillating circuit parameter by means of the measuring apparatus.

8. The method according to claim 7, wherein the exciting of the antenna structure is effected as an inductive exciting by means of a pulsed magnetic field, wherein the magnetic field is generated preferably by an individual current pulse and/or the current pulse is generated preferably as a direct current pulse in the form of a Dirac impulse.

9. A system for securing an object from forgery, comprising:

a seal element having an antenna structure; and at least one coupling element arranged at the object or arrangeable at the object;

wherein the seal element and the at least one coupling element are devised to be arranged at the object to be secured such that a relative arrangement of the antenna structure to the at least one coupling element at the object is fixed;

wherein the coupling element is provided and suitable to influence a value of an oscillating circuit parameter of the antenna structure when the antenna structure is arranged relative to the coupling element at the object, by the arranging, the value of the oscillating circuit parameter of antenna structure arranged at the object is defined in dependence on the fixed relative arrangement;

wherein the system comprises a measuring apparatus having a storage device which is devised such, when the antenna structure of the seal element and the at least one coupling element are arranged relative to each other at the object to be secured, to read out a seal identifier of the seal element and/or an object identifier of the object by means of a read-out device;

to measure the value of the oscillating circuit parameter of the antenna structure arranged at the object; and to store in the storage device and/or to transfer to a receiver of the object the measured value together with the read-out seal identifier and/or the read-out object identifier.

10. The system according to claim 9, wherein the antenna structure of the seal element and the at least one coupling element are arranged on a common carrier.

11. The system according to claim 9, wherein the antenna structure of the seal element and the at least one coupling element are arranged on different, separate carriers.

12. The system according to claim 9, wherein the at least one coupling element comprises an element acting as a capacity, in particular a metallic area, and/or that the at least one coupling element comprises an element acting as an inductance, in particular a coil, and/or that the at least one coupling element comprises a material with specified permittivity elevated compared with the surrounding region.

13. The system according to claim 9, wherein a multiplicity of coupling elements are present on a carrier, wherein the coupling elements are arranged on the carrier in irregular, preferably random, manner.

14. The system according to claim 9, wherein the measuring apparatus is devised, when the antenna structure of the seal element and the at least one coupling element are arranged relative to each other at the object to be secured;

to read out a seal identifier of the seal element and/or an object identifier of the object by means of the read-out device;

to measure the value of the oscillating circuit parameter of the antenna structure arranged at the object; and to compare the measured value with a reference value stored, together with the read-out seal identifier and/or the read-out object identifier, in the storage device.

15. The system according to claim 14, wherein the measuring apparatus comprises:

an exciter antenna for exciting the antenna structure by means of an energy pulse;

a measuring antenna for capturing a decaying oscillation of the antenna structure in response to the excitation by the energy pulse; and an evaluation device for evaluating the captured oscillation of the antenna structure with regard to the value of the oscillating circuit parameter.

16. The system according to claim 9, wherein the measuring apparatus comprises:

an exciter antenna for exciting the antenna structure by means of an energy pulse;

a measuring antenna for capturing a decaying oscillation of the antenna structure in response to the excitation by the energy pulse; and an evaluation device for evaluating the captured oscillation of the antenna structure with regard to the value of the oscillating circuit parameter.

\* \* \* \* \*